Nov. 6, 1962 H. V. GRIFFITTS 3,062,479
MEANS FOR FACILITATING REPLACEMENT OF SPRINGS
IN SPRING REWOUND TAGLINE DEVICES
Filed Sept. 14, 1959 2 Sheets-Sheet 1
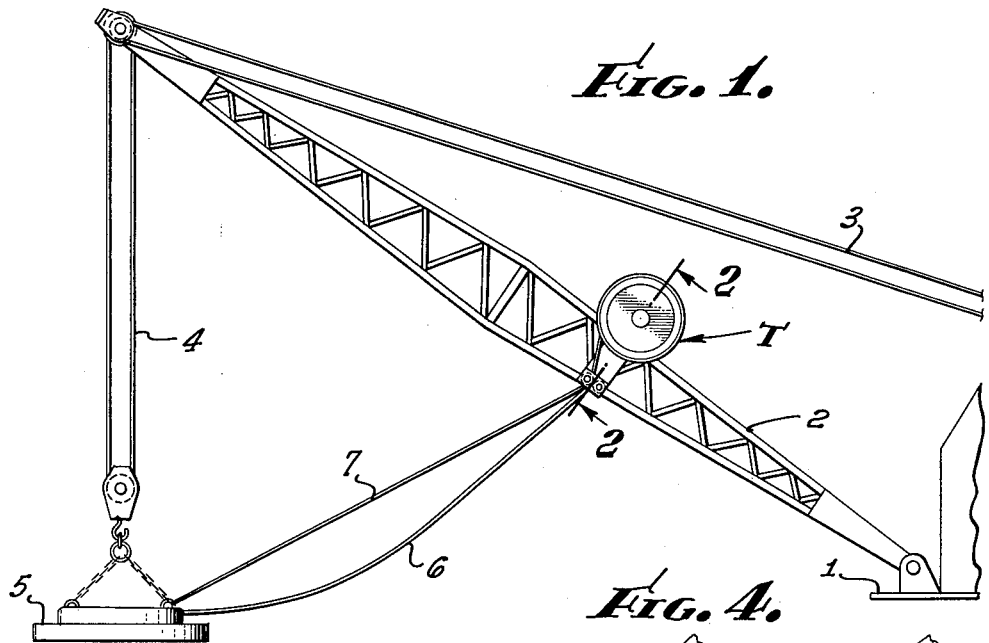
FIG. 1.
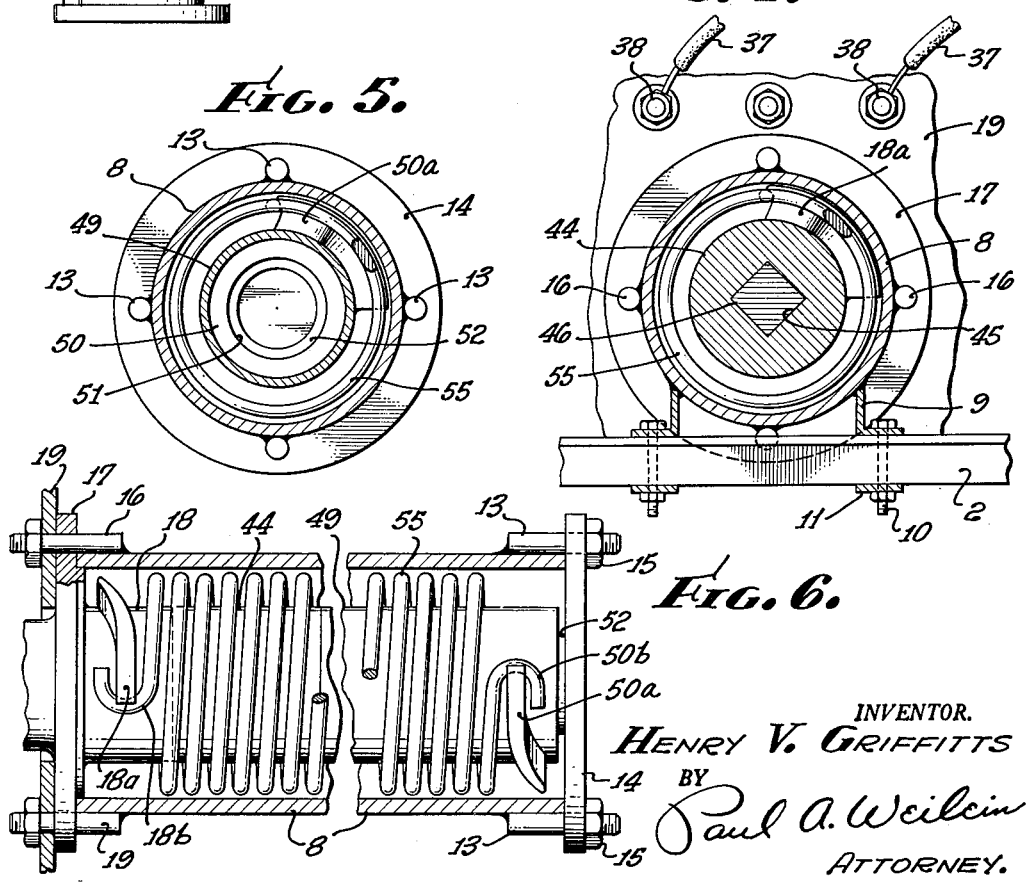
FIG. 4.
FIG. 5.
FIG. 6.
INVENTOR.
HENRY V. GRIFFITTS
BY
Paul A. Weilein
ATTORNEY.

Nov. 6, 1962  H. V. GRIFFITTS  3,062,479
MEANS FOR FACILITATING REPLACEMENT OF SPRINGS
IN SPRING REWOUND TAGLINE DEVICES
Filed Sept. 14, 1959  2 Sheets-Sheet 2

INVENTOR.
HENRY V. GRIFFITTS
BY
Paul A. Weilein
ATTORNEY.

United States Patent Office 3,062,479
Patented Nov. 6, 1962

3,062,479
MEANS FOR FACILITATING REPLACEMENT OF SPRINGS IN SPRING REWOUND TAGLINE DEVICES
Henry V. Griffitts, Los Angeles, Calif., assignor to McCaffrey-Ruddock Tagline Corporation, Los Angeles, Calif., a corporation of California
Filed Sept. 14, 1959, Ser. No. 839,801
4 Claims. (Cl. 242—107.5)

The present invention relates to tagline devices, and more particularly to spring rewound tagline devices wherein the spring-supporting core and coil spring may be readily removed to facilitate spring replacement.

Tagline devices of the type here involved are conventionally employed on cranes to maintain tension on a tagline which is connected to a material handling device, bucket, grab, magnet or the like, which is operated by the crane, to prevent erratic movement of the material handling device.

Tagline devices generally comprise a drum about which the tagline is wound, the drum being rotatably supported on the boom by means of a shaft extending into an elongated cylindrical housing in which is disposed a coiled torsion spring. The spring is disposed about a central core extending coaxially within the housing. Means are provided for driving the core along with the drum while the housing remains stationary. The coiled torsion spring being anchored at one end to a fixed element and at the other end being engaged with the core or a part rotatable with the core, so that the spring is wound or tensioned responsive to rotation of the drum in one direction so as to resiliently rewind the drum in the opposite direction as the load on the tagline is relieved.

Occasionally it becomes necessary to replace the torsion spring, and such operation should be performed with dispatch. If the crane should be in service as, for example, loading and unloading materials from a ship at a dock, substantial hourly expenses are entailed for dock rental, crane crew, crane operation and other labor. Such expenses must continue during the period of time required to repair the tagline device.

Accordingly, an object of the present invention is to provide a torsion spring rewound tagline device which is so constructed as to substantially facilitate the replacement of the torsion spring.

Heretofore, tagline devices of the type here involved have been constructed such that the rewind torsion spring which is located between the inner cylindrical core and the outer housing had to be removed from the relatively limited annular space between the core and the housing without removing the core, or alternatively, the drum assembly at the drum end of the core had to be disassembled in order to afford access to the core so that the latter could be removed from the housing to afford access to the spring. The latter course, of necessity, was frequently followed inasmuch as in some instances it was impossible to effectively remove the coiled spring from the small annular space between the core and the housing.

Accordingly, another object of the invention is to provide a tagline device of the above-mentioned type wherein the core may be readily removed without requiring disassembly of the tagline drum assembly. It will be recognized, of course, that the invention has distinct advantages when used in conjunction with ordinary tagline rewind devices of the type employed with buckets, grabs, and the like, but especially the present invention has significant advantages when employed in conjunction with a tagline rewind device for magnet type material handling elements wherein in addition to the tagline rewinding drum there is also a conductor cable drum about which the cable leading to the electromagnet is wound, and wherein there is a rotary collector ring assembly for establishing electrical contact between the line leading from the drum to the magnet and the conductor cable leading from a source of power. In this latter type of tagline device as heretofore known, it has been necessary to disassemble the entire tagline and conductor cable and collector ring assemblies from the torsion spring housing in order to enable removal of the core from the housing so as to facilitate replacement of the torsion spring.

In accordance with the foregoing, it is a further object to provide a tagline rewind device including an elongated housing having therein a core about which the conventional torsion spring is disposed, there being a readily removable closure at the opposite end of the housing from the rewind drum upon which the inner core is journalled, the core being driven at its opposite end by a separable drive connection so that upon removal of the closure the core may be readily extracted from the housing without requiring disassembly of the rewind drum mechanism at the other end of the housing.

Other objects and advantages of the invention will be hereinafter described or will become apparent to those skilled in the art, and the novel features of the invention will be defined in the appended claims.

Referring to the drawings:

FIG. 1 is a fragmentary elevational view showing a tagline device embodying the invention disposed upon the boom of a crane having suspended therefrom a magnet type material handling device;

FIG. 4 is a transverse sectional view as taken on the line 4—4 of FIG. 2;

FIG. 5 is a transverse view as taken on the line 5—5 of FIG. 2; and

FIG. 6 is a fragmentary detail view partly in elevation and partly in section illustrating the mounting of the spring about the inner core, the housing being broken away.

Like reference characters in the several figures of the drawings and in the following description designate corresponding parts.

Figure 2:
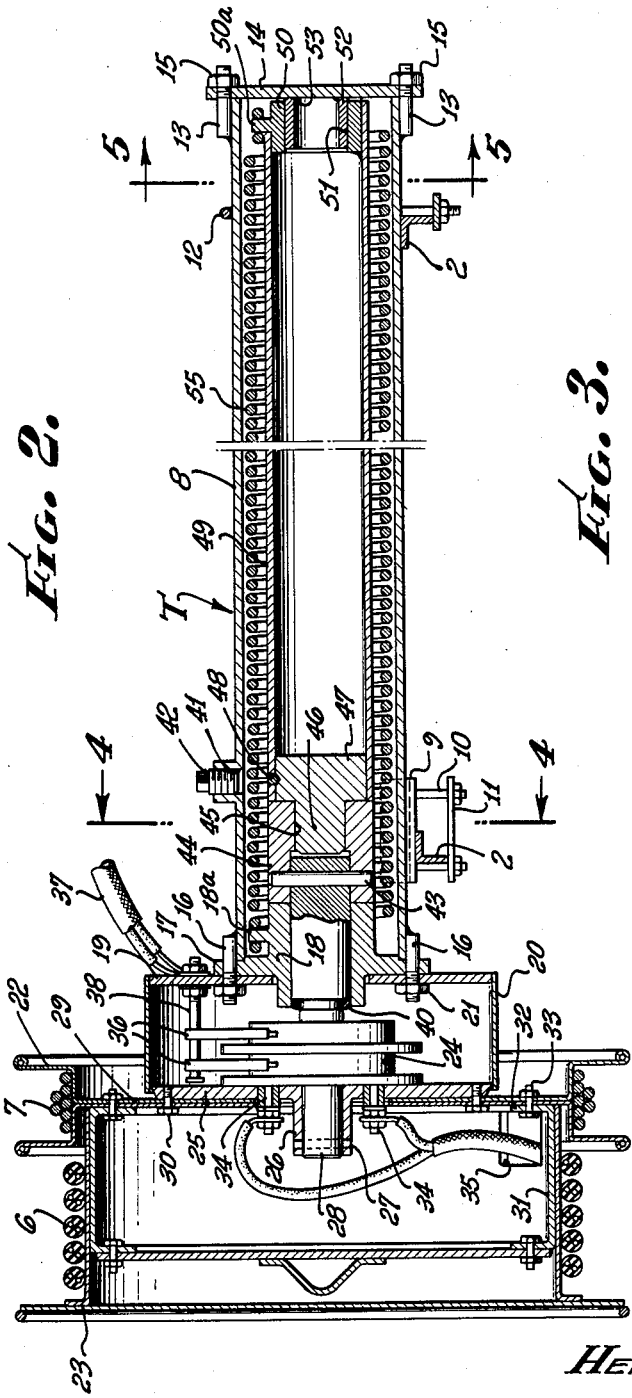
FIG. 2 is an enlarged longitudinal sectional view taken through the tagline device on the line 2—2 of FIG. 1.

Referring first to FIG. 1, there is illustrated a crane comprising a base 1 having a boom 2 projecting therefrom and adapted to be raised and lowered to different angles by means of a cable 3 operated by appropriate winches in the conventional manner. Suspended from the free end of the boom on a cable 4 is an electromagnet material handling device 5 which derives its current from an electric conductor cable 6 and which is stabilized by a tagline designated 7. The conductor cable and tagline 7 are disposed about a tagline rewind device generally designated T which is best illustrated in FIG. 2.

The tagline rewind device comprises a hollow housing 8 of elongated form which is connected to the boom 2 as by means of a bracket or saddle 9 underlying one end of the housing and fastened to the boom by means of bolts 10 and clamping plate 11. Adjacent the other end of the housing it is secured to the boom 2 as by a U-bolt 12. However, any appropriate means might be availed of for rigidly connecting the housing across the boom.

At one end the housing has welded or otherwise appropriately provided thereon a plurality of threaded stems 13 projecting beyond the extreme end of the housing for the reception of an end plate or closure 14 which is secured in abutting contact with the housing as by nuts 15 threaded on the stems 13. At its opposite end the housing 8 is provided with another series of circumferentially spaced threaded stems 16 extending through a radially projecting flange 17 of a fixed bushing 18 and through a plate 19 of a housing 20, the plate 19 and the flange 17 being secured to the housing as by nuts 21 threaded on the stems 16.

In the illustrative embodiment, the tagline device is shown as comprising a pair of drums respectively designated 22 and 23, the drum 22 constituting a rewind drum for the tagline 7 and the drum 23 constituting a rewind drum for the conductor cable 6. However, it will be understood that the invention hereof is applicable to rewind devices of the type employed for other conventional material handling devices than those which are electromagnetically operated, and that in such circumstances there would be only a rewind drum.

In the illustrative case, however, the housing 20 referred to above encloses a collector ring 24 which is drivingly connected to a plate 25 having centrally thereof a hub 26 keyed as at 27 to a shaft 28. It will be noted that the drum 22 is a two-part element having a supporting rim structure 29 connected as by screws 30 to the plate 25 so that the drum 22 and plate 25 rotate as a unit. In addition, the conductor cable drum 23 includes a hollow supporting member 31 having thereon a flange 32 connected as by screws 33 to the rim structure 29 of drum 22, whereby the conductor cable drum 23 will rotate in unison with the tagline drum 22 and the plate 25.

Contact posts 34 extend from the collector ring 24 through the plate 25 and into the zone within the conductor cable drum 23 where connection is made to the leads of the conductor cable 6 which projects into the drum through an opening 35. Current is supplied to the conductor cable 6 from the collector ring 24 and to the collector ring from brushes 36 which are respectively, as best seen in FIG. 4, connected to the leads of a conductor cable 37 as by means of posts 38, 38. The cable 37 leads to a source of electric current in a suitable and well known manner.

It will be noted that the shaft 28 extends through the collector ring 24 and is rotatably disposed in the bushing 18, there being a seal 40 between the shaft and the bushing in order to retain oil within the housing which is preferably filled as by means of an opening 41 having therein a plug 42.

The structure thus far described is more or less conventional and forms no part of the present invention except insofar as it constitutes environment for the novel features contemplated herein. However, as previously pointed out, tagline rewind devices ordinarily employ a coiled torsion spring which is anchored at one end and rotatably driven at the other end responsive to rotation of the shaft 28. To this end the shaft is keyed as by key 43 to a drive bushing 44 having a squared or other polygonal axial recess 45 in which is drivingly disposed a drive projection 46 of a head 47. Appropriately connected to the head 47, as by welding at 48, is one end of a tubular, elongated core 49. It will be recognized that the square recess 45 and the drive projection 46 provide a readily separable drive connection between the core 49 and the shaft 28.

At its other end the core 49 has welded or otherwise suitably secured thereto a bearing sleeve 50 having a central bore 51 rotatably disposed upon an internal bearing post 52 which in the illustrative embodiment is composed of a tubular element welded as at 53 to the end plate 14 previously described. As best seen in FIG. 6, the bushing 18 is provided on its outer periphery with a radially outstanding lug 18a and the bearing sleeve 50 also has an outstanding lug or projection 50a. These lugs 18a and 50a face in opposite directions and constitute anchors for the hooked opposite ends 18b and 50b of a coiled torsion spring 55.

Thus it will be observed that rotation of the tagline drum 22 in a direction to play out the tagline 7 as the boom 2 is elevated in reference to the magnet 5 or vice versa, is transmitted to the shaft 28 and thence to the drive sleeve or bushing 44 through pin or key 43. Such rotation is imparted to the inner core 49 of the assembly and thence to lug 50a at the extremity of the core remote from the bushing 18.

Since the lug 18a is carried by the bushing 18 and the bushing 18 is stationary, it will be observed that the spring will be wound or tensioned responsive to such rotation of the core 49. Thus, as the magnet 5 is raised in reference to the boom 2 or the boom is lowered in reference to the magnet, the tagline 7 as well as the conductor cable 6 will be rewound on the drums 22 and 23, respectively.

Heretofore, when it has been desired to replace the spring within the relatively small annular space defined between the core 49 and the housing 8, it has been necessary to gain access to the housing from the drum end of the latter in order to remove the core. Otherwise, the prior art contemplates a construction in which the end of the housing remote from the drum, that is the end plate 14 in the illustrative embodiment, is removable so as to expose the spring in the annular space from which it may be extracted without removing the core. This latter operation would be quite time consuming and in many instances impossible where the spring has been broken and severely bound in the annular space.

Figure 3:
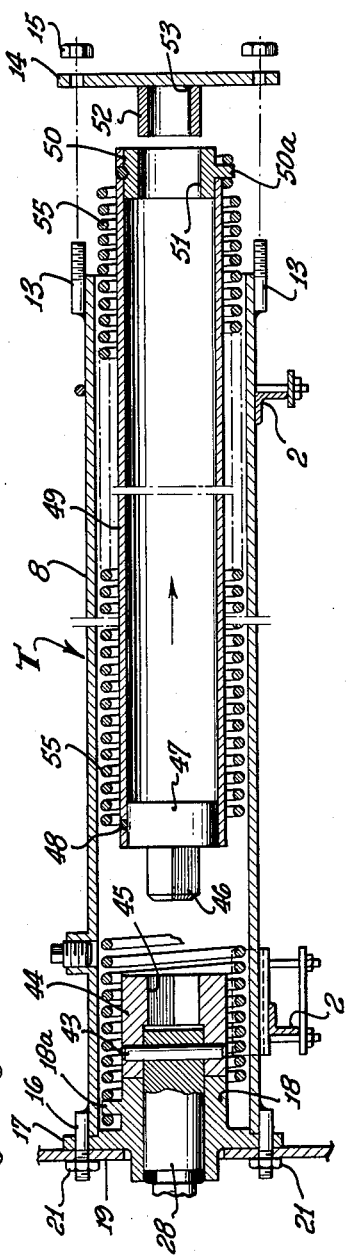
FIG. 3 is a fragmentary exploded detail view in section illustrating the method of disassembly of the inner core and coiled torsion spring from the housing.

With particular reference to FIG. 3 of the present embodiment, it will be observed that removal of the inner core 49 from within the housing 8 is an extremely simple operation requiring only the removal of the nuts 15 from retainer elements 13 and removal of the end plate 14. With the end plate 14 removed it will be noted that the core may be withdrawn from within the housing and the releasable coupling comprised by member 44 and the polygonal projection 46 on member 47 enables ease of removal of the core 49 as well as subsequent ease of reinstallation of the latter. With the core 49 removed from the housing, removal and replacement of the spring 55 is an extremely simple operation.

From the foregoing it will be observed that the various objectives of the invention as stated at the commencement hereof have been advantageously accomplished and while the specific details of the invention have been herein shown and described, changes and alterations may be resorted to without departing from the spirit of the invention as defined in the appended claims.

I claim:

1. A spring loaded tagline rewind device comprising: an elongated housing; a drum rotatably mounted at one end of said housing for the reception of a tagline; an elongated core rotatably disposed within the elongated housing with its ends adjacent the ends of the housing; said core and housing providing therebetween an annular and relatively narrow spring-receiving space; means at said one end of the housing including freely axially slidable and separable interengaging means drivingly connecting said core with said drum but permitting free sliding removal of said core from said drum, in an axial direction, while said drum is disposed at said one end of said housing; means rotatably supporting said core at the other end of the housing including a support removably mounted on said other end of said housing to permit said removal of said core; and a helical torsion spring extending the length of said core in said spring-receiving space; means operatively connecting one end of said spring with the end of said core that is disposed adjacent said other end of said housing; and means connecting the other end of said spring with said one end of said housing.

2. A spring loaded tagline rewind device comprising: an elongated housing; a drum rotatably mounted at one end of said housing for the reception of a tagline; an elongated core disposed within the elongated housing with its ends adjacent the ends of the housing; said core and housing providing therebetween an annular and relatively narrow spring-receiving space; connecting means at said one end of the housing defining an axially facing non-circular socket; non-circular means on an end of said core, complementary to said socket and slidably positioned therein; means supporting the other end of said core at the other end of the housing and including a support removably mounted on said other end of said housing and having means removably engaged with said other end of said core to support the same; and a helical torsion spring extending the length of said core in said spring-receiving space; means operatively connecting one end of said spring in driving relation to said drum; and means connecting the other end of said spring with said housing whereby said support may be removed from said housing and core to permit axial removal of said core from said housing and connecting means.

3. A spring loaded tagline rewind device comprising: an elongated housing; a drum rotatably mounted at one end of said housing for the reception of the tagline; an elongated core rotatably disposed within the elongated housing with its ends adjacent the ends of the housing; said core and housing providing therebetween an annular and relatively narrow spring-receiving space; connecting means on said drum defining an axially facing non-circular socket; non-circular means on an end of said core, complementary to said socket and slidably positioned therein to drivingly connect said core with said drum but permitting removal of said core from said drum, in an axial direction, while said drum remains mounted at said one end of said housing; means rotatably supporting said core at the other end of the housing including an end plate removably mounted on said other end of said housing and having a centrally located bearing projection on which the other end of said core is journalled; and a helical torsion spring extending the length of said core in said spring-receiving space; means operatively connecting one end of said spring with the end of said core that is disposed adjacent said other end of said housing; and means connecting the other end of said spring with said one end of said housing.

4. A tagline rewind device comprising: an elongated housing; an elongated core disposed within said housing with its ends adjacent ends of the housing and providing between the core and housing an annular and relatively narrow spring-accommodating space; a tagline drum rotatably mounted on one end of said housing; means rotatably supporting said core at the other end of said housing and being removable from said housing and core to open said other end of the housing; means forming a separable drive connection between said rewind drum and said core at said one end of said housing including a shaft connected to said drum and extending into said housing; a tubular drive sleeve keyed to said shaft and having a non-circular central opening therein; and a member carried by said core and having a non-circular projection thereon complemental to the non-circular opening in said drive sleeve and removably disposed therein whereby said removal of said core may be effected when said other end of said housing is open and while said drum remains at said one end of said housing.

References Cited in the file of this patent

UNITED STATES PATENTS

| | | |
|---|---|---|
| 2,099,268 | Henson et al. | Nov. 16, 1937 |
| 2,166,479 | Ruddock | July 18, 1939 |
| 2,181,141 | Lovegran | Nov. 28, 1939 |
| 2,303,002 | Ruddock | Nov. 24, 1942 |
| 2,645,432 | Griffitts | July 14, 1953 |
| 2,680,004 | Herker | June 1, 1954 |